May 2, 1950
L. K. WIETZ
2,506,400
MAGNETIC SUPPORT
Filed Sept. 10, 1947
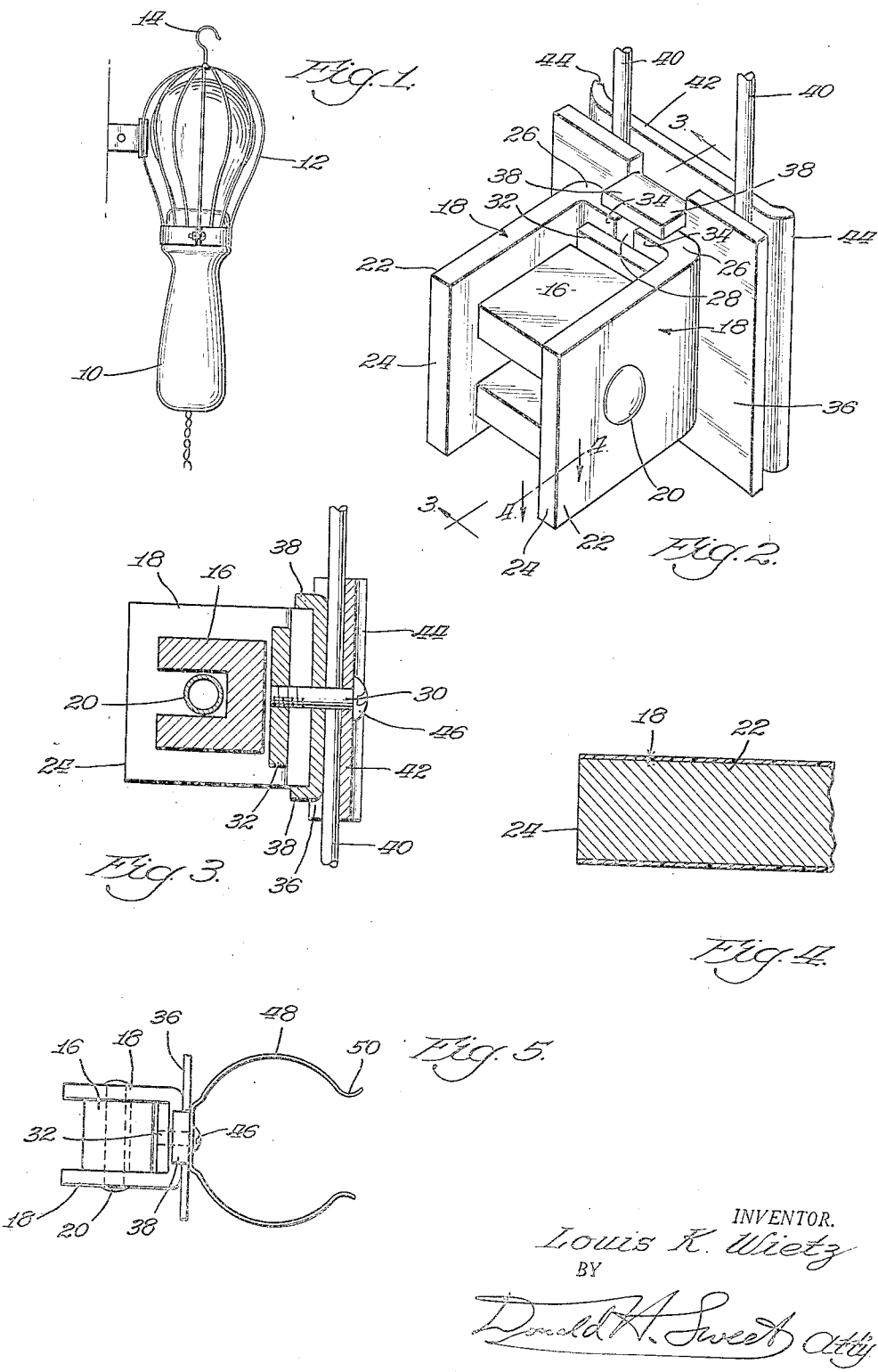
INVENTOR.
Louis K. Wietz
BY
Donald H. Sweet Atty Patented May 2, 1950

2,506,400

UNITED STATES PATENT OFFICE 2,506,400

MAGNETIC SUPPORT

Louis K. Wietz, Chicago, Ill.

Application September 10, 1947, Serial No. 773,154

1 Claim. (Cl. 248—206)

My invention relates to attachments for supporting various articles and includes among its objects and advantages the development of a magnetic holding clip of a high degree of permanency and a wide range of adaptability.

In the accompanying drawings:

Figure 1 is a view of a portable electric light socket equipped with a holding attachment according to the invention;

Figure 2 is a perspective view of the holding attachment itself;

Figure 3 is a section as on line 3—3 of Figure 2;

Figure 4 is an enlarged detail section as on line 4—4 of Figure 2; and

Figure 5 indicates a modified structural connection to the supported object.

In garages, machine shops, factories and many other places where portable electric lights are used, the usefulness of such a light is materially limited by the lack of a convenient way of making the light stay where it is put. Of course it will always stay on a floor or other flat support, but the desired illumination usually calls for a position halfway up a wall or the like. It has been customary to provide such portable lights with hooks so that they can be hung in any place where the hook can find a hold. This is a material help. In practicing the invention in connection with portable electric lights I prefer to employ such a hook and also to employ the magnetic support of the invention. But the magnetic support is also useful in supporting an object of any sort, such as a portable electric flashlight, which has no cord, or a small article to be carried on a portable conveyor belt while being processed as by sandblasting, spray painting, drying, etc.

Magnetic supports for this purpose have been frequently proposed for many decades, but, so far as I am aware, none of them combined sufficient durability and sufficient cheapness to achieve success in practical ways. The main defect was that after a few months use the magnet lost its strength.

Referring now to Figure 1, I have indicated a conventional portable electric light, including a rubber handle 10 and a wire bird cage 12 to enclose the electric light, with a hook 14 at the top of the bird cage. The magnetic support comprises the U-shaped block magnet 16 and twin pole pieces 18 of cold rolled steel, permanently riveted to the magnet by a tubular rivet 20. If the magnet is made with an open U cross section, certain advantages in assembly and replacement are secured, compared with the conventional annular form.

Each of the pole pieces 18 includes a branch 22, referred to for convenience as the external branch. These branches extend in parallelism away from the magnet in the same direction and terminate in polished naked end faces 24, shaped for fitting engagement with the metal object or objects to which the support is intended to be affixed. I prefer to complete the fabrication and mechanical assembly of the parts so far described and then dip the assembly in plastic paint to give it a thin protective coating. Then the faces 24 are cleaned by abrasion and then the assembly is magnetized to generate a north pole at one end of the rivet 20 and a south pole at the other end.

Each pole piece 18 also includes another branch 26, referred to as the internal branch. The branches 26 extend away from the poles of the magnet in such a direction that they do not interfere with putting the branches 24 against a metal structure. They are shaped to end in slightly spaced relation to define a narrow air gap 28. It is the alternative flux circuit through the branches 26 and gap 28 that secures permanence in the strength of the magnet. When the branches 22 are in functioning contact with a metal structure, substantially all the strength of the magnet will be exerted in holding the branches 22 against the structure because the resistance of the internal magnetic circuit is at such a time many times greater than the resistance of the external magnetic circuit. But when the device is inactive, the resistance of the internal magnetic circuit is still many times less than that of the circuit through the wide air gap between the branches 22. The parts are designed so that the predetermined value of the magnetic resistance of the interior circuit is low enough to permit the metal of the magnet 16 to carry a flux density during inactive periods high enough so that the magnet is not weakened.

By locating the gap 28 on the median plane of the magnet I secure a convenient mechanical configuration for the connecting means to connect the support to the supported object. In case of the portable electric light, the non-magnetic tension bolt 30 passes through the gap 28 and is threaded into a nut or plate 32 housed between the magnet and the inturned ends 34 of the internal branches, which define a rectangular cavity to receive the plate 32 and restrain it from rotation.

Suitable mechanical clips are provided for structural connection with the bird cage 12. I have illustrated a base plate 36 in abutment with the external faces of the ends 34, restrained against rotation with respect to the magnet structure, as by short flange portions 38, bent down to engage the sides of the branches 26. The base plate 36 is long enough to bridge the gap between two of the wires 40 of the bird cage 12, and the clamping plate 42 is preferably stiffened a little by flanges 44 along its longitudinal edges and centrally apertured to receive the bolt 30. Tightening the bolt forces the bolt head 46 down and clamps everything rigidly together.

Others may readily adapt the invention for use under various conditions of service by employing one or more of the novel features involved, or equivalents thereof. It will, for instance, be obvious that, as illustrated in Figure 5, the plate 42 may be replaced by a simple resilient clip 48 adapted to have the object to be supported thrust between its spring fingers 50. Such a clip is useful in connection with an ordinary portable flashlight with a cylindrical barrel, or in holding objects to be subjected to manufacturing process as they travel around on a conveyor belt, which belt can be of any metallic construction, to permit an operator to affix an object to it without the necessity of securing precise registration with irregularities in the structure of the belt.

As at present advised with respect to the apparent scope of my invention I desire to claim the following subject matter:

In a device of the class described, in combination: a linear permanent magnet of U-shaped cross section; having plane north and south pole faces at opposite ends, facing in coaxial directions away from each other; pole pieces of magnetic metal without magnetic permanency lying in contact with said faces; said pole pieces ending in widely spaced terminals at one side of said magnet, and in slightly spaced terminals on the other side of said magnet; a non-magnetic tension rivet housed inside said magnet and holding said pole pieces in place; and mechanical connections of non-magnetic material gripping both slightly spaced terminals for supporting an article; said widely spaced terminals having plane faces in a common plane parallel to the magnet axis.

LOUIS K. WIETZ.

REFERENCES CITED

The following references are of record in the file of this patent:

UNITED STATES PATENTS

| Number | Name | Date |
|---|---|---|
| 1,932,143 | Piercy | Oct. 24, 1933 |
| 2,269,149 | Edgar | Jan. 6, 1942 |